(12) United States Patent
Freas, II

(10) Patent No.: US 10,206,539 B2
(45) Date of Patent: Feb. 19, 2019

(54) MULTIFUNCTION PROGRAMMABLE FOODSTUFF PREPARATION

(71) Applicant: The Boeing Company, Chicago, IL (US)

(72) Inventor: George Wilson Freas, II, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 935 days.

(21) Appl. No.: 14/180,852

(22) Filed: Feb. 14, 2014

(65) Prior Publication Data

US 2015/0230664 A1  Aug. 20, 2015

(51) Int. Cl.
*A47J 44/00* (2006.01)
*B65D 81/34* (2006.01)
*B65D 81/32* (2006.01)

(52) U.S. Cl.
CPC .............. *A47J 44/00* (2013.01); *B65D 81/32* (2013.01); *B65D 81/3484* (2013.01); *B65D 2581/3401* (2013.01)

(58) Field of Classification Search
CPC ......... A47J 44/00; B01F 15/06; B01F 15/065; B65D 81/33; B65D 81/3484; B65D 2581/3401
USPC ................................................ 366/138, 277
See application file for complete search history.

(56) References Cited

U.S. PATENT DOCUMENTS

| | | | |
|---|---|---|---|
| 4,540,288 A * | 9/1985 | Pandolfi | A23G 9/12 366/145 |
| 4,649,810 A * | 3/1987 | Wong | A47J 27/14 222/501 |
| 5,363,746 A * | 11/1994 | Gordon | A23G 9/12 366/145 |
| 5,460,209 A | 10/1995 | Jandura et al. | |
| 5,975,366 A | 11/1999 | Ridgley | |

(Continued)

FOREIGN PATENT DOCUMENTS

GB  2466336 A  *  6/2010  .............. A47J 27/08

OTHER PUBLICATIONS

Daugherty, Trevor, "The Yecup 365 travel mug uses your iphone to heat or cool your drink", 9T05Toys, Accessed on Aug. 16, 2016, Retrieved from the Internet: http://9to5toys.com/2016/04/04/yecup-365-travel-mug/, 5 pgs.

(Continued)

*Primary Examiner* — Marc C Howell
(74) *Attorney, Agent, or Firm* — Kwan & Olynick LLP

(57) ABSTRACT

Systems, methods, and devices are disclosed for preparing food. In some embodiments, a food preparation device may include a container that includes a cavity that may define an internal volume of the container. The food preparation device may also include a first plate coupled to a first end of the container. The first plate may include at least one hole configured to receive the at least one food ingredient. Also included may be a second plate coupled to a second end of the container and a mixing device coupled to the first plate. The mixing device may be configured to mix at least a portion of the internal volume of the container. The food preparation device may also include a heat transfer device coupled to the container. The heat transfer device may be configured to exchange thermal energy with the internal volume of the container.

19 Claims, 12 Drawing Sheets

(56) References Cited

U.S. PATENT DOCUMENTS

| | | | | |
|---|---|---|---|---|
| 6,523,994 | B2* | 2/2003 | Lawson | A47J 43/085 241/282.2 |
| 6,793,387 | B1 | 9/2004 | Neas et al. | |
| 2008/0257168 | A1 | 10/2008 | Wolfe | |
| 2010/0008180 | A1* | 1/2010 | Krogh | A01M 7/0085 366/138 |
| 2010/0260005 | A1* | 10/2010 | Bodum | A47J 43/0465 366/144 |
| 2010/0301042 | A1* | 12/2010 | Kahlert | B01F 7/18 220/23.86 |
| 2011/0116340 | A1* | 5/2011 | Gerl | B22C 5/044 366/145 |
| 2016/0353932 | A1 | 12/2016 | Freas, II | |

OTHER PUBLICATIONS

Garfield, Leanna, "MIT students invented a robotic kitchen that could revolutionize fast food", Tech Insider, Retrieved from the Internet: http://www.techinsider.io/mit-students-invented-a-robotic-kitchen-2016-4, Apr. 18, 2016, 5 pgs.

"Canadian Application Serial No. 2,876,485, Office Action dated Dec. 4, 2015", 3 pgs.

"European Application Serial No. 15155226.2, Search Report dated Jun. 1915", 6 pgs.

"Moley", Retrieved from the Internet: http://moley.com/#, Accessed on May 28, 2015, 11 pgs.

"Real-life Star Trek 'replicator' makes meals in 30 seconds", Retrieved from the Internet: http://www.metro.us/lifestyle/real-life-star-trek-replicator-makes-meals-in-30-seconds/zsJoel---bGrbNRIDR5izk/, Accessed on May 15, 2015, 2 pgs.

"Bartendro—A Cocktail Dispensing Robot", Kickstarter, Retrieved from the Internet: <http://www.kickstarter.com/projects/partyrobotics/bartendro-a-cocktail-dispensing-robot>, Accessed on Feb. 5, 2014, 11 pgs.

"Breadmakershopper.com", The Home Baker, Dec. 2, 2012, Retrieved from the Internet: <http://breadmakershopper.com/andrew-james/andrew-james-premium-breadmaker-with-automatic-ingredientsnut-and-raisin-dispensera-brand-you-can-trust/,>, Accessed on Feb. 5, 2014, 7 pgs.

"Food Printing—"The Killer App" of 3D Printing", 3Ders.org, Oct. 30, 2011, Retrieved from the Internet: <http://www.3ders.org/articles/20111030-food-printing-the-killer-app-of-3d-printing.html>, Accessed on Feb. 5, 2014, 9 pgs.

"Seville", DarenthMJS Ltd., 2014, Retrieved from the Internet: <http://www.darenthmjs.com/seville/>, Accessed on Feb. 5, 2014, 2 pgs.

"The Coming Food Printer Revolution", FuturistSpeaker.com, Oct. 4, 2011, Retrieved from the Internet: <http://www.futuristspeaker.com/2011/10/the-coming-food-printer-revolution/http://www.futuristspeaker.com/2011/10/the-coming-food-printer-revolution/>, Accessed on Feb. 5, 2014, 16 pgs.

Templeton, Graham, "NASA funds 3D food printer, to combat hunger in space and on Earth", ExtremeTech, May 21, 2013, Retrieved from the Internet: <http://www.extremetech.com/extreme/156355-nasa-funds-3d-food-printer-to-combat-hunger-in-space-and-on-earth>, Accessed on Feb. 5, 2014, 4 pgs.

* cited by examiner

MULTIFUNCTION PROGRAMMABLE FOODSTUFF PREPARATION

TECHNICAL FIELD

This disclosure generally relates to food preparation methods and devices and, more specifically, to food preparation methods and devices which may be programmable and substantially automated.

BACKGROUND

Food ingredient dispensers and preparation devices typically have separate chambers for mixing ingredients and heating ingredients. More specifically, ingredients may be mixed in a first vessel and subsequently transferred to an oven to create the final food product. For example, in commercial food factories, large hoppers of ingredients deliver ingredients into a mixer. After the ingredients are mixed, the mixture is transferred to an oven or cooler to make the final food product. As such, conventional ingredient dispensers and mixers remain limited because they may require the use of multiple containers or vessels during the preparation of food. Moreover, conventional ingredient dispensers and mixers typically cannot operate in low or zero-gravity environments (e.g., the International Space Station (ISS)). Further still, conventional ingredient dispensers and mixers often require user intervention, and are not substantially automated.

SUMMARY

Disclosed herein are systems, methods, and devices for preparing food. According to some embodiments, devices for preparing food are disclosed. The devices may include a container including a cavity configured to store at least one food ingredient. The cavity may define an internal volume of the container. The devices may also include a first plate coupled to a first end of the container. The first plate may include at least one hole configured to receive the at least one food ingredient. The devices may also include a second plate coupled to a second end of the container and a mixing device coupled to the first plate. The mixing device may be configured to mix the at least one food ingredient in the internal volume of the container. Moreover, the mixing device may include a mixing blade configured to move between the first plate and the second plate while mixing the at least one food ingredient. The devices may further include a heat transfer device coupled to the container. The heat transfer device may be configured to exchange thermal energy with the internal volume of the container.

In some embodiments, the heat transfer device may include a plurality of thermoelectric devices coupled to an external surface of the container. Moreover, the heat transfer device may further include a plurality of passive cooling devices coupled to the plurality of thermoelectric devices. In some embodiments, the mixing device includes a threaded shaft positioned in the cavity of the container, a mixing blade operable to be coupled to the threaded shaft, and a plunger disc operable to be coupled to the threaded shaft. According to some embodiments, the devices may also include a positioning actuator configured to couple and decouple each of the mixing blade and the plunger disc with the threaded shaft. The devices may further include a food storage device including a plurality of food containers. At least one of the plurality of food containers is configured to be coupled with the at least one hole of the first plate.

In some embodiments, the devices further include a communications interface configured to be communicatively coupled with a data processing system. The data processing system may be configured to control one or more food preparation operations associated with the at least one food ingredient. The devices may also include a display device configured to display information describing one or more food preparation operations associated with the at least one food ingredient. The devices may further include a keypad configured to receive at least one input from a user. In some embodiments, the devices also include a telemetry device configured to identify and transmit positional data associated with one or more components of the mixing device. The devices may also include a plurality of temperature sensors configured to identify and transmit thermal data associated with the heat transfer device and the internal volume of the container. In some embodiments, at least one magnet may be included in a mixing blade of the mixing device. The telemetry device may include a plurality of coils of wire, where each coil of wire of the plurality of coils of wire is configured to transmit a signal in response to detecting a magnetic field generated by the at least one magnet.

According to some embodiments, the devices also include a cleaning device configured to clean the internal volume of the container. The cleaning device may include a plurality of containers configured to inject soap and water into the internal volume of the container, and an evacuation device configured to empty the internal volume of the container. The evacuation device may include a vacuum. In some embodiments, the container, the first plate, the second plate, the mixing device, and the heat transfer device are included in an external container, where the external container is configured to be portable and hand-held.

Also disclosed herein are methods for preparing food. The methods may include receiving a recipe selection, where the recipe selection identifies at least one food ingredient and a plurality of food preparation operations associated with the at least one food ingredient. The methods may further include receiving the identified at least one food ingredient in a container including a cavity configured to store a plurality of food ingredients, where the cavity defines an internal volume of the container. The methods may also include thermally regulating the at least one food ingredient based on the plurality of food preparation operations identified by the received recipe selection. The methods may also include mixing the at least one food ingredient based on the plurality of food preparation operations identified by the received recipe selection.

In some embodiments, the thermally regulating includes automatically controlling a temperature of the internal volume of the container via a plurality of thermoelectric devices. According to some embodiments, the mixing includes automatically engaging a mixing blade positioned within the internal volume of the container, and automatically rotating the mixing blade to mix the at least one food ingredient included in the internal volume of the container. In some embodiments, the methods may further include injecting soap into the internal volume of the container, injecting water into the internal volume of the container, and evacuating the internal volume of the container.

Further disclosed herein are systems for preparing food. The systems may include a container including a cavity configured to store at least one food ingredient, where the cavity defines an internal volume of the container. The systems may also include a first plate coupled to a first end of the container, where the first plate includes at least one hole configured to receive the at least one food ingredient. The systems may further include a second plate coupled to a second end of the container and a mixing device coupled to the first plate, where the mixing device is configured to mix at least a portion of the internal volume of the container. The systems may also include a heat transfer device coupled to the container, where the heat transfer device is configured to exchange thermal energy with the internal volume of the container. The systems may further include a data processing system configured to control the mixing device and the heat transfer device based on one or more food preparation operations included in a computer control program associated with the at least one food ingredient.

In some embodiments, the systems may further include a telemetry device configured to identify and transmit positional data associated with one or more components of the mixing device. The systems may also include a plurality of temperature sensors configured to identify and transmit thermal data associated with the heat transfer device and the internal volume of the container. According to some embodiments, the computer system may be configured to receive the positional data and thermal data, and may be further configured to provide one or more instructions to the mixing device and the heat transfer device based on the received positional data and thermal data.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As previously discussed, conventional ingredient dispensers typically have separate chambers for mixing ingredients and heating ingredients. Thus, conventional ingredient dispensers typically require additional equipment and additional processing steps which may result in a longer food preparation process which occupies more resources. Moreover, the additional equipment may be relatively bulky and might not be suitable for deployment in an aircraft or spacecraft. Furthermore, conventional ingredient dispensers and mixers typically cannot operate in low or zero-gravity environments (e.g., the International Space Station (ISS)) because they do not provide the ability to effectively and reliably introduce ingredients and evacuate the mixture once complete in the absence of gravity.

Various systems, methods, and devices disclosed herein may provide the substantially automated preparation of food and foodstuffs in terrestrial and extraterrestrial contexts. In some embodiments, a terrestrial context may refer to or describe environments on or near the ground or at altitudes in which gravity pulls the prepared food toward the ground. Accordingly, a terrestrial context or environment may include buildings (residential or commercial) or aircraft (e.g., as part of the galley). Moreover, an extraterrestrial context may refer to an environment in which food is not pulled in a particular direction by gravity. For example, an extraterrestrial context or environment may include a spacecraft or space station. As disclosed herein, several food ingredients may be mixed and thermally regulated in a single chamber or container. Thus, the entire process of preparing the food may occur in a single container, and the final food product may be subsequently dispensed for consumption by users, such as a flight crew. In some embodiments, a computer system may automate and implement substantially all steps of the preparation of the food. Moreover, various components of food preparation devices disclosed herein may be configured such that the prepared food product may be effectively and reliably dispensed regardless of whether or not a gravitational force acts upon the prepared food.

Figure 1:
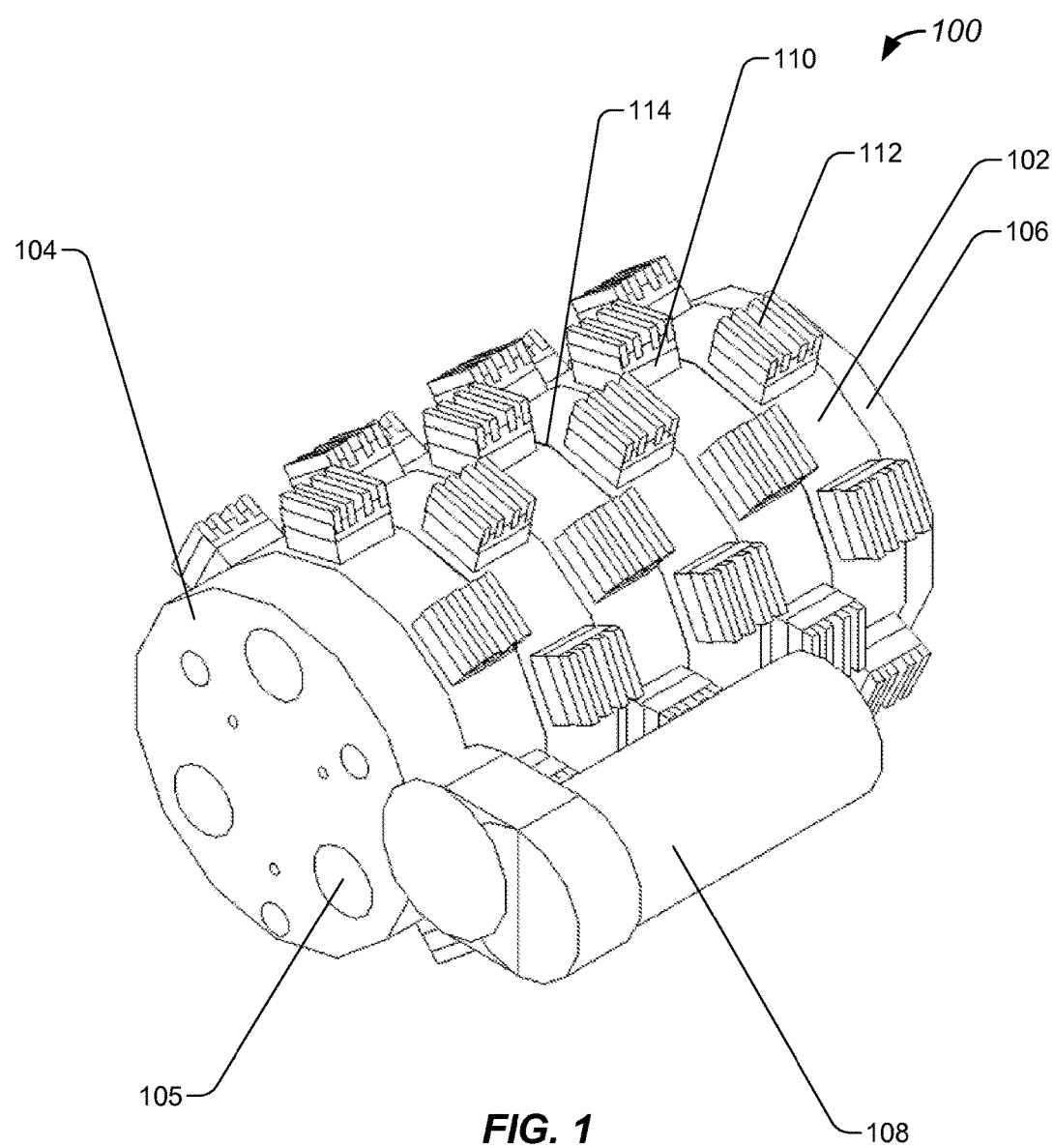
FIG. 1 illustrates an example of a programmable food preparation device configured to automatically prepare food, implemented in accordance with some embodiments.

FIG. 1 illustrates an example of a programmable food preparation device configured to automatically prepare food, implemented in accordance with some embodiments. Food preparation device 100 may automatically deliver predetermined amounts of food ingredients into a container, such as container 102. In the container, the food ingredients may be mixed and thermal energy may be exchanged with the food ingredients. In this way, the mixture of food ingredients is not transferred from the container until the final food product is finished. As similarly discussed above, food preparation device 100 may be used terrestrially or extra-terrestrially. Thus, food preparation device 100 may be used to automatically prepare food in the presence or absence of a gravitational force. As will be discussed in greater detail below, one or more components of food preparation device 100 may be configured based on whether the operational environment of food preparation device 100 will be terrestrial or extra-terrestrial.

Food preparation device 100 may include container 102 which may be configured to receive and store one or more food ingredients. In some embodiments, container 102 may include a cavity that defines an internal volume of container 102. For example, container 102 may be substantially hollow and have an internal volume that is a cylindrical cavity. Accordingly, as shown in FIG. 1, container 102 may have a substantially cylindrical shape. It will be appreciated that container 102 may be configured to have any suitable geometry. For example, container 102 may have a hexagonal, octagonal, or square geometry. In various embodiments, container 102 may be made of a material that is thermally and electrically conductive. For example, container 102 may be made of a metal such as aluminum or stainless steel. In some embodiments, a relatively light metal, such as aluminum, may be preferable for aerospace applications.

In some embodiments, an internal volume of container 102 may be bounded by one or more plates. For example, container 102 may be coupled with first plate 104 and second plate 106. In some embodiments, each of first plate 104 and second plate 106 may be removably coupled with container 102 such that, when coupled, an air and water tight seal is formed between each plate and container 102, thus sealing the internal volume of container 102. Moreover, when decoupled, the plates and container 102 may be disassembled into separate pieces, as may be appropriate during one or more cleaning operations. In some embodiments, first plate 104 and second plate 106 may be removably coupled to container 102 via a hinge or mechanical lock, and a seal may be established via the use of one or more gaskets that line the interface between container 102 and each of first plate 104 and second plate 106.

In various embodiments, first plate 104 and/or second plate 106 may include one or more ports or holes, such as hole 105. The ports or holes may be configured to provide access to the internal volume of container 102. For example, holes included in first plate 104 may be configured to mechanically couple with food receptacles which may include one or more food ingredients. For example, a particular recipe may include two food ingredients, where each food ingredient may be prepackaged in a separate food receptacle or container. Each food receptacle may be coupled with a hole in first plate 104 via, for example, a threaded screw mount. In this way, the prepackaged food receptacles that include the ingredients of the recipe may be coupled with food preparation device 100, and the food ingredients may be introduced into the internal volume of container 102.

Moreover, the holes may be configured to be coupled with other components and/or systems associated with or included in food preparation device 100. For example, a hole, such as hole 105, may be configured to be coupled with an exhaust hose which may be used to vent gasses which may form during the preparation of the food. In another example, the hole may be configured to be coupled with one or more hoses of a cleaning system which may be used to provide soap and water during one or more cleaning operations. Furthermore, one or more holes in second plate 106 may be configured to be coupled with one or more hoses of an evacuation system which may be used to evacuate the contents of container 102 after the preparation of the food is complete. For example, the evacuation system may include a vacuum pump that is configured to apply suction to the internal volume of container 102, and move the contents of container 102 to another vessel or container which may be used to serve the food. In some embodiments, each of the holes may include a cover that is configured to seal the hole when not in use. For example, a cover may be a metal screw cover that screws onto a threaded portion of a hole, such as hole 105.

Food preparation device 100 may also include motor 108 which may include an electric motor and an associated drive train. In various embodiments, motor 108 may be electrically coupled to an external power source. Furthermore, motor 108 may be mechanically coupled to a mixing device, which may be included in and positioned within the internal volume of container 102, as discussed in greater detail below with reference to FIG. 3A and FIG. 3B. Motor 108 may further include hardware and software configured to communicate with a computer system, which may be an external computer system, via a communications interface. As will be discussed in greater detail below with reference to FIG. 5 and FIG. 6, the computer system may include a computer control program that, when executed, provides one or more instructions to food preparation device 100, and may control operation of motor 108.

In some embodiments, food preparation device 100 may include at least one heat transfer device 110. As shown in FIG. 1, food preparation device 100 may include several heat transfer devices which may be configured to control and regulate a temperature of food preparation device 100 and a temperature of the internal volume of container 102. In some embodiments, the heat transfer devices may be thermal electric devices that are configured to change temperature in response to the application of an electrical current to the thermal electric devices. For example, a heat transfer device, such as heat transfer device 110, may be a thermoelectric device. In some embodiments, a thermoelectric device may cause a first change in temperature in response to a first current passing through the thermoelectric device in a first direction, and may cause a second change in temperature in response to a second current passing through the thermoelectric device in a second direction. Thus, heat transfer device 110 may be configured to increase a temperature and transfer heat to container 102 in response to the application of a first current to heat transfer device 110. Moreover, heat transfer device 110 may be further configured to decrease a temperature and remove heat from container 102 in response to the application of a second current. In this way, heat transfer device 110 may exchange thermal energy with container 102, and may heat or cool container 102 and its internal volume based on the application of one or more currents to heat transfer device 110. In some embodiments, an example of such a thermoelectric device may be a Peltier device, or any other suitable device capable of generating a heating or cooling effect responsive to different currents and/or voltages. Furthermore, heat transfer devices, such as heat transfer device 110, may include additional types of heating or cooling devices, such as heat strips and heating plates, to further enhance the heating and cooling capabilities of food preparation device 100.

In various embodiments, each of the heat transfer devices may be electrically coupled to one or more current sources which may be configured to control the current applied to each of the heat transfer devices. The current source may be an external current source and may be configured to determine a current applied to the heat transfer devices based on a computer control program associated with the recipe that is being prepared, and also based on data or information provided by the heat transfer devices themselves. As is discussed in greater detail below with reference to FIG. 5 and FIG. 6, a computer control program may identify one or more food preparation operations, such as heating one or more food ingredients to a particular temperature. The computer control program may be executed by a computer system which may be communicatively coupled to the current source and cause the current source to apply a current to the heat transfer devices, thus heating the contents of container 102. While a current source has been described, it will be appreciated that a voltage source may be used as well.

In some embodiments, one or more temperature sensors may be included in food preparation device 100 that provide feedback to the computer system and current source. In some embodiments, the temperature sensors may be included within the heat transfer devices, or may be embedded within a wall of container 102. The temperature sensors may be communicatively coupled to the computer system and/or current source via a communications interface. The temperature sensors may be configured to periodically or dynamically measure the temperature of the contents of container 102 and provide the measured temperature data to the computer system and/or current source. In this way, the computer system and/or current source may be provided with feedback regarding the temperature of the contents of container 102, and may cease the application of a current once a target temperature has been achieved, or may apply a current if a range from a target temperature has been exceeded.

According to some embodiments, additional cooling devices may be coupled to the heat transfer devices. For example, at least one passive cooling device 112 may be coupled to each heat transfer device 110. In this example, passive cooling device is a metal heat sink, which may be made of copper, that is air cooled by an external air circulation system. In some embodiments, a liquid cooling device or system may be coupled to the heat transfer devices and may circulate a coolant, which may be water, through a series of tubes or pipes to facilitate the cooling of the heat transfer devices.

In various embodiments, food preparation device 100 may include several telemetry devices which may be configured to monitor and report positional data about one or more components included within food preparation device 100. For example, food preparation device 100 may include a telemetry device, such as telemetry device 114, which may be a coil of conductive wire that is wrapped around container 102. The coil of wire may be localized to a particular portion or region of container 102. In this example, the coil of wire included in telemetry device 114 may be configured to detect local magnetic distortions which may be caused by the movement of one or more components of a mixing device. For example, as will be discussed in greater detail below with reference to FIGS. 3A and 3B, a mixing device may include one or more components, such as a mixing blade. The mixing blade may be configured to move within an internal volume of container 102 in any suitable way. For example, the mixing blade may move between first plate 104 and second plate 106. Such movement may be rotational, longitudinal, or a combination of rotational and longitudinal movement within the internal volume of container 102. The mixing blade may include one or more permanent magnets. When the mixing blade is near telemetry device 114, the rotation and proximity of the mixing blade may cause a change in magnetic field applied to telemetry device 114, and induce a current through the coil of wire included in telemetry device 114. The spacing of the telemetry devices and the strength of the permanent magnets may be configured such that the presence of the mixing blade is detected by only a single telemetry device at a time. In various embodiments, telemetry device 114 may be coupled to a computer system via a communications interface. The induced current may be provided to the computer system as an input that identifies the telemetry device reporting the signal and also indicates that the mixing blade has been detected. In this way, the computer system may determine the position or location of the mixing blade within container 102 based on a signal received from a telemetry device.

Figure 2:
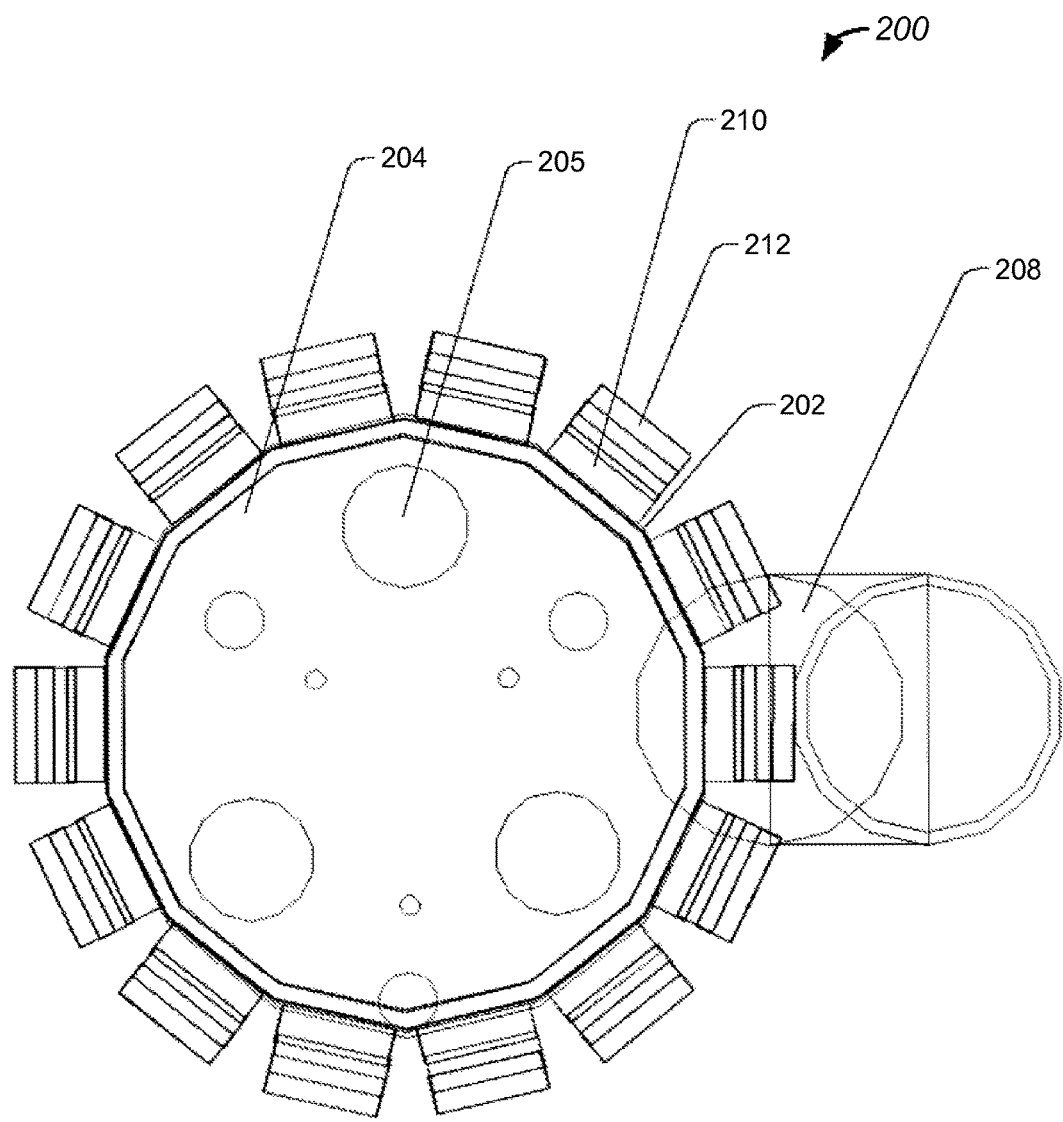
FIG. 2 illustrates a top view of an example of a programmable food preparation device configured to automatically prepare food, implemented in accordance with some embodiments.

FIG. 2 illustrates a top view of an example of a programmable food preparation device configured to automatically prepare food, implemented in accordance with some embodiments. As discussed above with reference to FIG. 1, food preparation device 200 may include container 202, first plate 204, hole 205, motor 208, heat transfer device 210, and passive cooling device 212. As shown in FIG. 2, the overall geometry of food preparation device 200 may be substantially cylindrical. In some embodiments, sides of food preparation device 200 and container 202 may be beveled to provide a flat contact surface for one or more heat transfer devices, such as heat transfer device 210. Accordingly, food preparation device 200 and container 202 may be configured to have a number of sides determined based on a number of heat transfer devices included in food preparation device 200. Furthermore, a size, geometry, and dimension of each side may be configured based on the geometry of the heat transfer devices. In this example, fourteen substantially square heat transfer devices are included. Accordingly, container 202 of food preparation device 200 includes fourteen sides, each beveled to provide a flat contact area with the heat transfer devices. Moreover, holes included in a plate, such as hole 205 included in first plate 204, may be arranged in various suitable configurations. For example, holes included in first plate 204 may be arranged in concentric rings, thus leaving a central attachment point for a mixing blade of a mixing device, as discussed in greater detail below with reference to FIG. 3A and FIG. 3B.

Figure 3A:
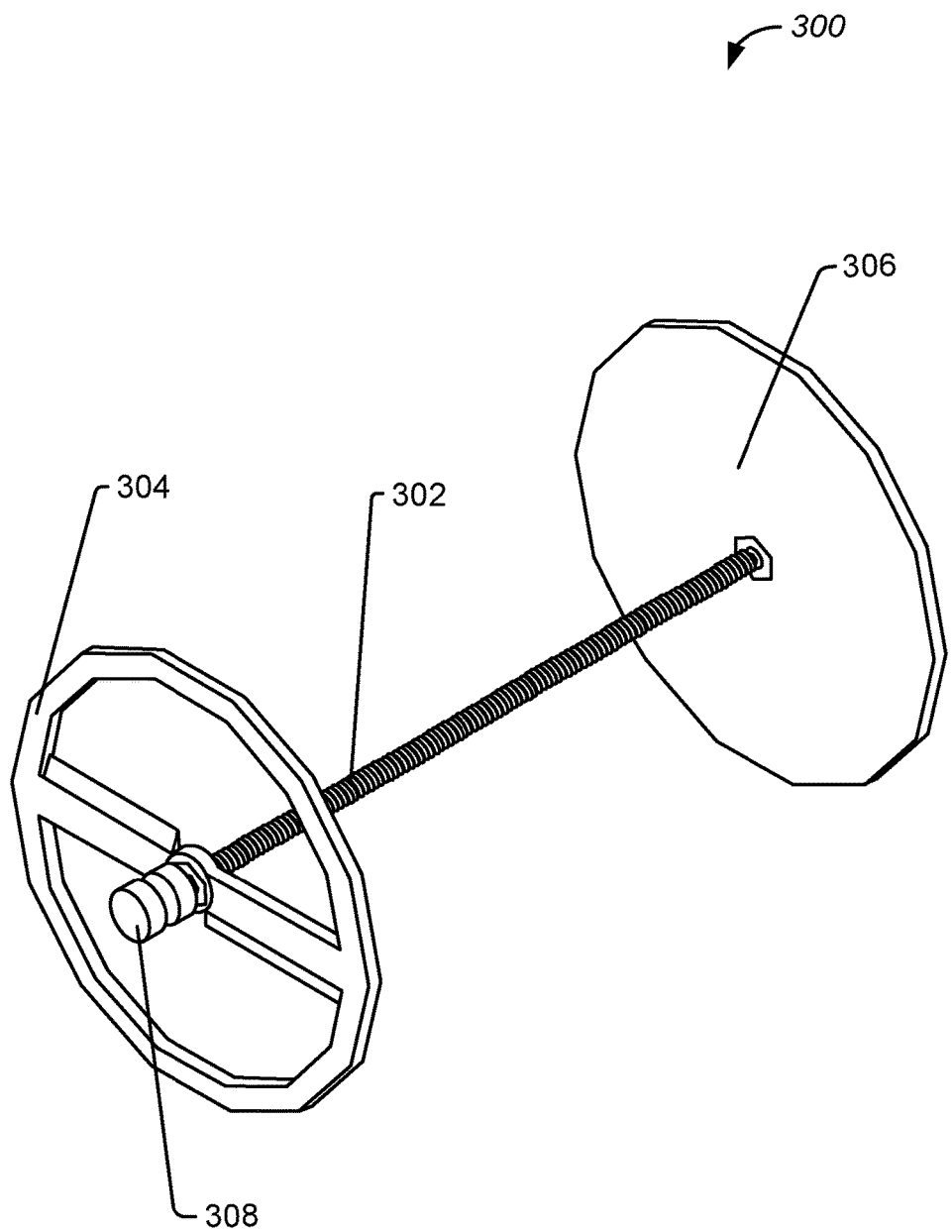
FIG. 3A illustrates an example of one or more components of a mixing device that may be included in a food preparation device, implemented in accordance with some embodiments.

FIG. 3A illustrates an example of one or more components of a mixing device that may be included in a food preparation device, implemented in accordance with some embodiments. As discussed above with reference to FIG. 1, a food preparation device may include a mixing device, such as mixing device 300. In some embodiments, mixing device 300 may include threaded shaft 302, mixing blade 304, plunger disc 306, and attachment point 308. According to some embodiments, threaded shaft 302 may function as a central transport screw and may be mechanically coupled to a motor to rotate in either a clockwise or counter-clockwise direction. Furthermore, mixing blade 304 and plunger disc 306 may include threaded through-holes which mate with threaded shaft 302 such that rotation of threaded shaft 302 may cause movement of mixing blade 304 and/or plunger disc 306 when they are threaded. In this way, threaded shaft 302 may be rotated to move and rotate mixing blade 304 and mix the contents of a container of a food preparation device, such as container 102 discussed above with reference to FIG. 1. Furthermore, threaded shaft 302 may be rotated to move plunger disc 306 towards an end of the container to force the contents of the container out of the container via one or more holes in a plate. Thus, in an extra-terrestrial operational environment where there is little to no gravitational force, plunger disc 306 may force the contents of the container out of the container and into another container or vessel.

In some embodiments, mixing device 300 may selectively move mixing blade 304 and plunger disc 306 independently or together. For example, mixing device 300 may include a positioning actuator that may be configured to adjust a position of threaded shaft 302 to determine which, if any of mixing blade 304 and plunger disc 306 are engaged and moved by the rotation of threaded shaft 302. For example, the screw positioning actuator may have a first position in which neither mixing blade 304 nor plunger disc 306 are threaded or engaged. In this example, both mixing blade 304 and plunger disc 306 may be nested at one end of the container, and threaded shaft 302 might not be in contact with their respective threaded through-holes. Furthermore, the positioning actuator may have a second position in which only mixing blade 304 is threaded by threaded shaft 302 and is rotationally engaged. In this instance, the position of threaded shaft 302 may be adjusted or moved along an axis of the container such that threaded shaft 302 contacts and threads the through-hole of mixing blade 304, but does not contact and thread the through-hole of plunger disc 306. Further still, the positioning actuator may have a third position in which both mixing blade 304 and plunger disc 306 are threaded by threaded shaft 302 and are engaged. In this instance both mixing blade 304 and plunger disc 306 may be moved along the length of the container, and plunger disc 306 may force the prepared food out of the container.

In some embodiments, through-hole of mixing blade 304 may be enclosed in a collar bearing, which may be coupled on its outer surface to mixing blade 304. Additionally, the through-hole of plunger disc 306 may be similarly configured and may also be enclosed in a collar bearing. Thereby, when threaded shaft 302 is rotationally engaged to mixing blade 304 or plunger 306, mixing blade 304 and plunger 306 may rotate independently of threaded shaft 302. Moreover, mixing blade 304, plunger 306, or both may be constrained to a particular mixing path by engaging a pin rod (or another similar device) perpendicular to the tangent of the circular edge of mixing blade 304 or plunger 306. The pin rod may be engaged with a channel groove cut in the interior wall of container 102. Thus, when threaded shaft 302 needs to be rotationally engaged to either mixing blade 304, plunger 306, or both, the pin rod is engaged with the channel groove causing the rotation of mixing blade 304, plunger 306, or both along a predefined path. Additionally, the rotational speed of threaded shaft 302 may be varied to modify or change an effect of the rotational force onto mixing blade 304. For example, a motor coupled to threaded shaft 302 may have a low rotation per minute (RPM) setting and a high RPM setting. In this way, the rotational speed of threaded shaft 302 may be varied to cause mixing blade 304 to mix the contents of container 102 in either a slow manner or a more vigorous manner.

Figure 3B:
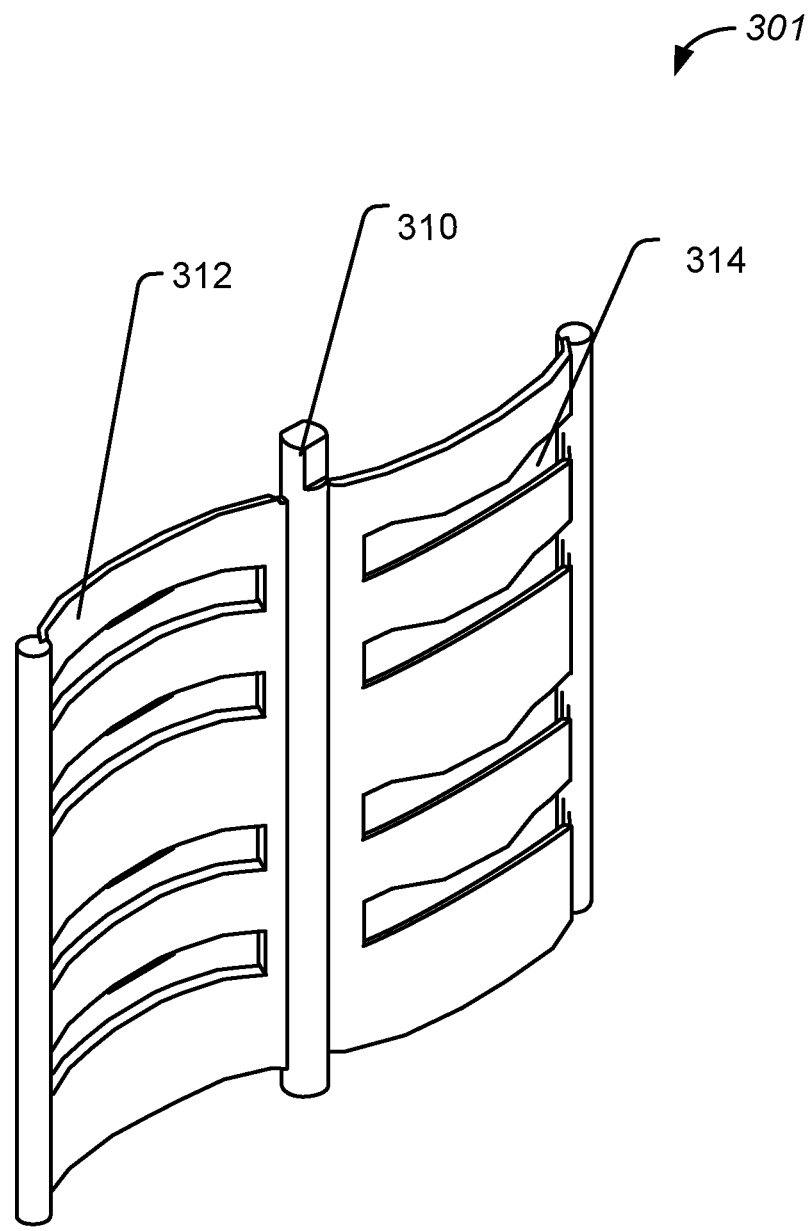
FIG. 3B illustrates another example of one or more components of a mixing device that may be included in a food preparation device, implemented in accordance with some embodiments.

FIG. 3B illustrates another example of one or more components of a mixing device that may be included in a food preparation device, implemented in accordance with some embodiments. As shown in FIG. 3B, mixing device 301 may include central shaft 310 and mixing blade 312, which may include a number of holes, such as hole 314. In some embodiments, central shaft 310 may be coupled to a motor which may cause central shaft to rotate, as well as mixing blade 312 which may be coupled to or integrated with central shaft 310. Accordingly, mixing blade 312 may be rotated and mix the internal contents of a food preparation device which may include a container, such as container 102 discussed with reference to FIG. 1. In some embodiments, mixing device 301 may be used in terrestrial operational conditions. Accordingly, a gravitational force may be used to remove contents of the container upon completion of preparation of the food.

Figure 4:
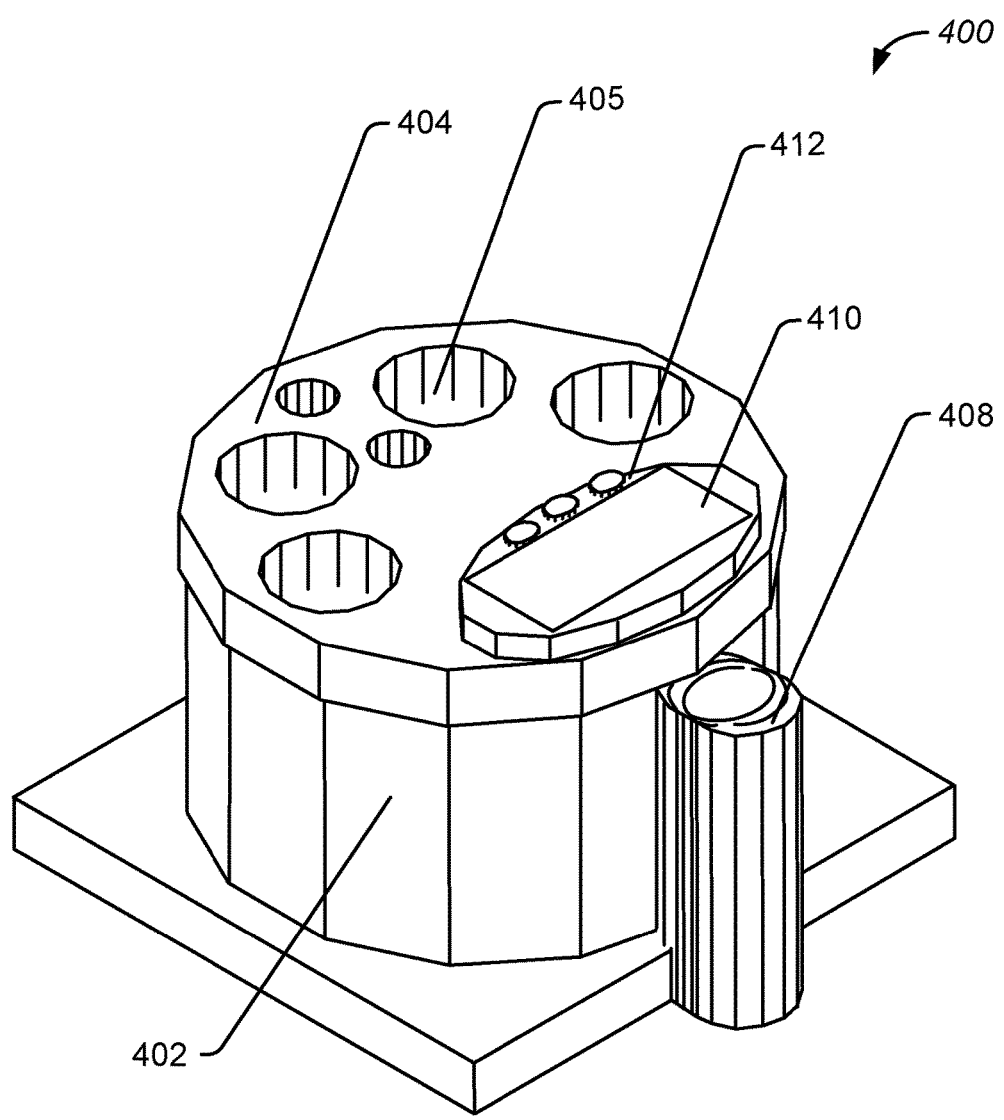
FIG. 4 illustrates a top view of another example of a programmable food preparation device that includes an interactive display, implemented in accordance with some embodiments.
Figure 9:
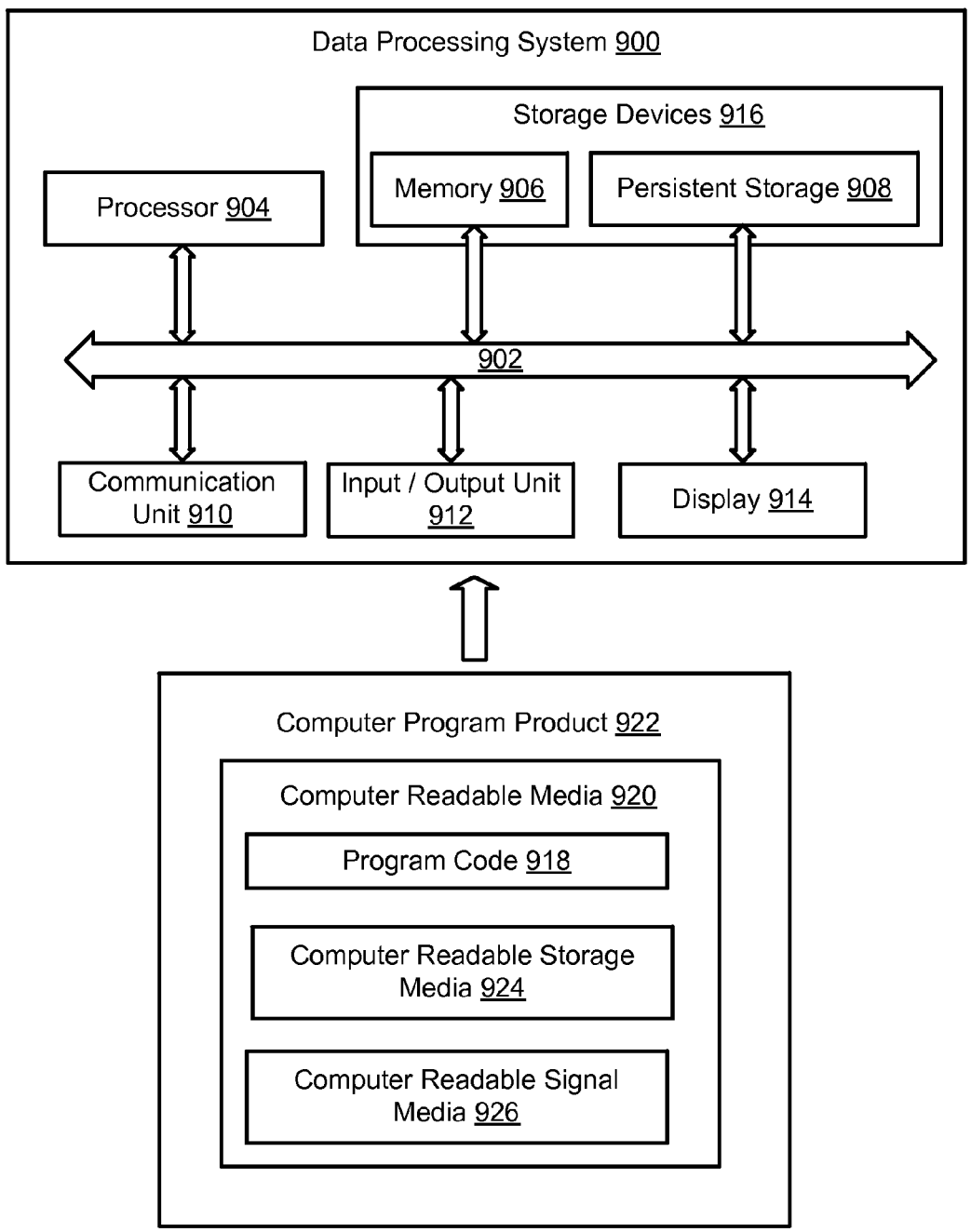
FIG. 9 illustrates a data processing system, configured in accordance with some embodiments.

FIG. 4 illustrates a top view of another example of a programmable food preparation device that includes an interactive display, implemented in accordance with some embodiments, such as device 100 (shown in FIG. 1), device 200 (shown in FIG. 2), as well as device 500 and device 600 (shown in FIGS. 5A, 5B, 6A, and 6B) discussed in greater detail below. As discussed above with reference to FIG. 1, food preparation device 400 may include container 402, plate 404, hole 405, and motor 408. Furthermore, food preparation device 400 may include display device 410 and various input buttons, such as button 412. As discussed above with reference to device 100, a flight version of a programmable food preparation device may be operated by a laptop computer, a hand-held computing device, or a data processing system, such as system 900 (as shown in FIG. 9). According to some embodiments, a display and buttons may be implemented on the programmable food preparation device itself to facilitate control of the food preparation process. In some embodiments, the display may include a temperature display, and buttons and/or thumb dial to control one or more parameters, such as a temperature. Accordingly, a display device, such as display device 410, may be communicatively coupled to the laptop or hand held computing device.

In some embodiments, display device 410 may be an interactive display, such as a capacitive touch screen configured to receive one or more tactile inputs from a user. In various embodiments, display device 410 may be a liquid crystal display. Display device 410 may be configured to display various information associated with the preparation of food within food preparation device 400. As stated above, display device 410 may be coupled to a computer system via a communicative interface. Accordingly, display device 410 may be configured to receive data for display from the computer system, and may be further configured to provide data, such as a user input to the computer system.

For example, display device 410 may provide an interactive menu through which a user may select one or more recipes for a food to be prepared. In this example, the recipes and one or more data values representing an interactive menu may be stored on the computer system and may be provided to display device 410. Display device 410 may receive an input from a user which may be a selection of a particular recipe. The input may be provided to the computer system and food preparation may begin based on a control program associated with the selected recipe. Various instructions and status information associated with the recipe may also be displayed on display device 410. For example, if a user is required to perform a step, such as coupling a food receptacle to a plate, an appropriate instruction may be provided on display device 410. Moreover, display device 410 may also display status information associated with each step of the food preparation process, such as an identifier that identifies the current step, temperature information associated with the step, and temporal information, such as an amount of time remaining in that step and in the entire preparation process.

Figure 5A:
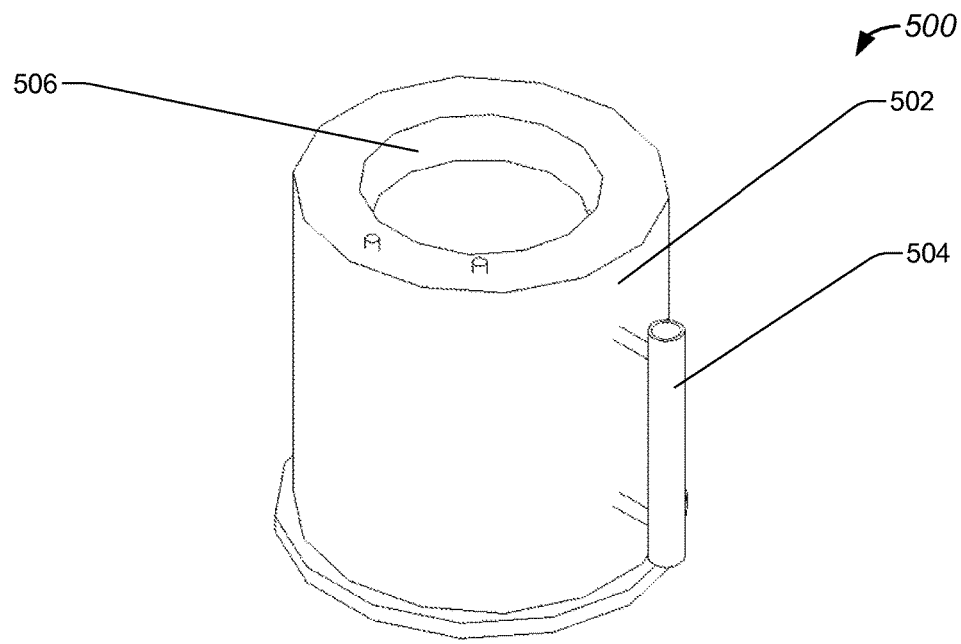
FIG. 5A illustrates another example of a programmable food preparation device configured to automatically prepare food, implemented in accordance with some embodiments.

FIG. 5A illustrates another example of a programmable food preparation device configured to automatically prepare food, implemented in accordance with some embodiments. As previously discussed, a programmable food preparation device, such as programmable food preparation device 500, may be configured to mix, thermally regulate, and otherwise prepare food in a single container. Accordingly, programmable food preparation device 500 may include various components which may be housed in or coupled to a container, such as external container 502. In various embodiments, programmable food preparation device 500 and its associated components may be configured to maximize portability of the entire programmable food preparation device. For example, programmable food preparation device 500 may be configured as a hand-held device which may be carried by a user, thus providing a portable device that may be configured to prepare and serve food. As stated above, various components included in programmable food preparation device 500 may be configured to achieve such portability. For example, programmable food preparation device 500 may be configured to include a portable and rechargeable power source, which may be a battery, and a communications interface that is wireless thus enabling the electronics included programmable food preparation device 500 to communicate wirelessly with a controller implemented in a computer system.

Accordingly, external container 502 may be configured as a hand-held mug or cup, and other components included in programmable food preparation device 500 may be configured to fit within external container 502. For example, external container 502 may include or be coupled to handle 504. In some embodiments, handle 504 may be removably coupled to external container 502, and may include thermal insulation configured to limit a maximum temperature of an external surface of handle 504. In some embodiments, external container 502 may also include thermal insulation configured to limit an external temperature of external container 502 and programmable food preparation device 500.

In some embodiments, external container 502 further includes opening 506 which may be configured to be coupled to one or more internal components of programmable food preparation device 500, as discussed in greater detail below with reference to FIG. 5B. Furthermore, opening 506 may provide an opening through which prepared food may be consumed upon completion of a food preparation process. Thus, the container of programmable food preparation device 500 may be configured to prepare food, and may be further configured to provide a serving vessel for the food once preparation has completed.

Figure 5B:
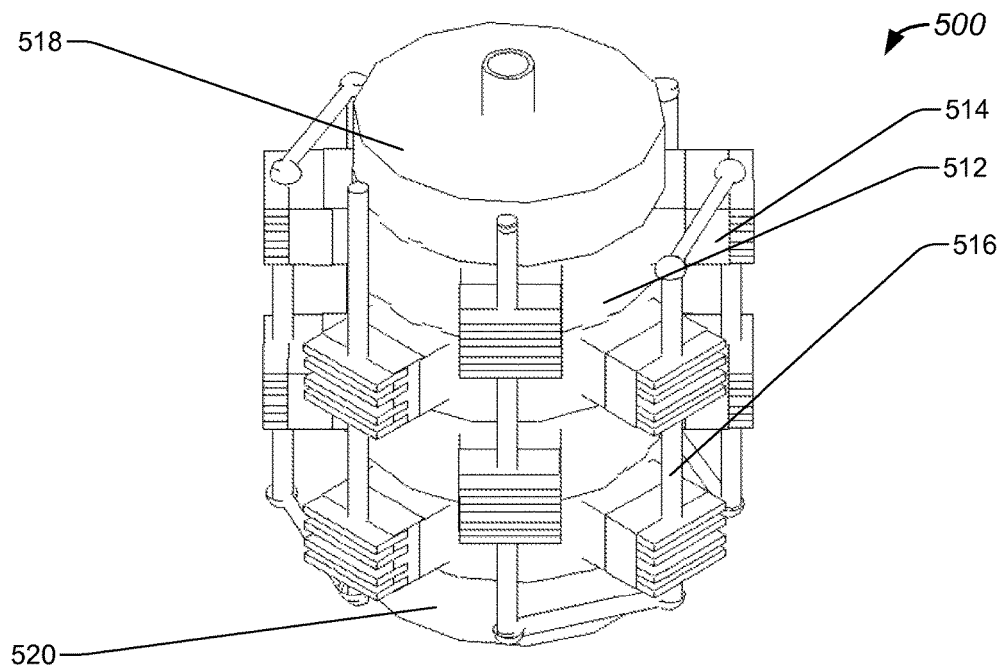
FIG. 5B illustrates an example of one or more components that may be included in a programmable food preparation device configured to automatically prepare food, implemented in accordance with some embodiments.

FIG. 5B illustrates an example of one or more components that may be included in a programmable food preparation device configured to automatically prepare food, implemented in accordance with some embodiments. As similarly discussed above, programmable food preparation device 500 may include various components configured to automatically or semi-automatically prepare food. For example, programmable food preparation device 500 may include internal container 512 which may be configured to receive and store one or more food ingredients. Moreover, programmable food preparation device 500 may include a thermal regulation system that includes thermoelectric devices, such as thermoelectric device 514, and support members, such as support member 516, which may also be configured as passive cooling devices. Programmable food preparation device 500 may further include top plate 518 and bottom plate 520. In various embodiments, internal container 512, the thermoelectric devices, the support members, top plate 518, and bottom plate 520 may all be configured to be housed within external container 502 discussed above with reference to FIG. 5A. Accordingly, the entirety of programmable food preparation device 500 may be configured to be portable and included in a hand-held container.

In some embodiments, support member 516 may also be configured to route a second food/beverage therethrough while a first food/beverage is being prepared within internal container 512. For example, a plurality of hot food ingredients may be prepared within internal container 512 while a cold beverage may be prepared within tubing of support member 516. In this way, both heating and cooling properties of thermoelectric devices included within programmable food preparation device 500 may be utilized simultaneously to heat and cool food ingredients/beverages.

Furthermore, according to some embodiments, top plate 518 and/or bottom plate 520 may be configured to facilitate the delivery of the prepared food product. In some embodiments, top plate 518 may be removably coupled to internal container 512, and may be removed through opening 506. In this example, upon completion of food preparation, top plate 518 may be removed, as well as a mixing device which may be included within internal container 512, and the prepared food product may be served and consumed directly from internal container 512. In various embodiments, bottom plate 520 may be configured to include one or more holes or ports that are configured to facilitate evacuation of the contents of internal container 512 to another external vessel.

Figure 6A:
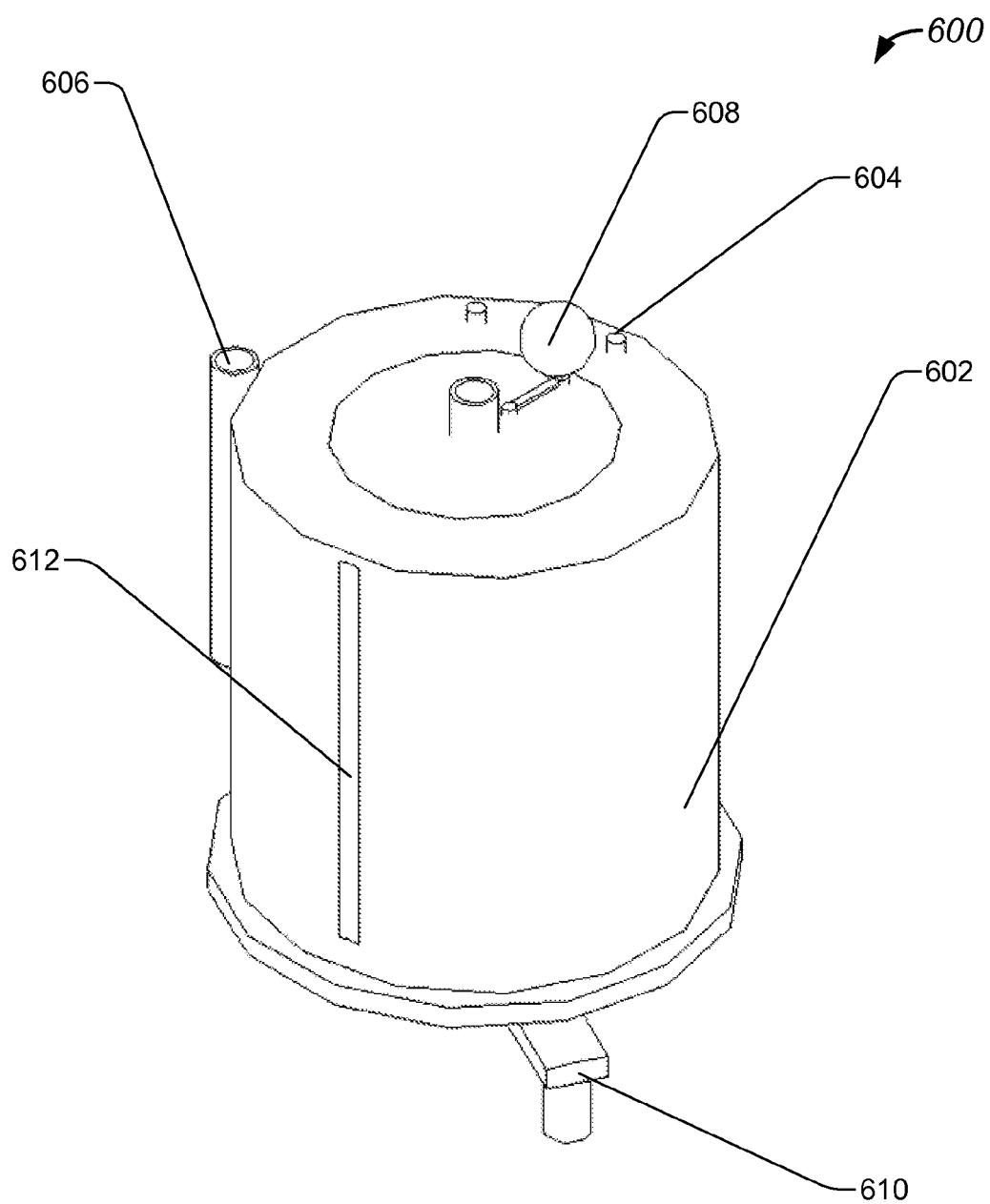
FIG. 6A illustrates an example of a programmable food preparation device configured to prepare food, implemented in accordance with some embodiments.

FIG. 6A illustrates an example of a programmable food preparation device configured to prepare food, implemented in accordance with some embodiments. As discussed above with reference to FIG. 5A and FIG. 5B, a programmable food preparation device, such as programmable food preparation device 600 may be configured to maximize portability and may be configured as a hand-held mug. As similarly discussed above, programmable food preparation device 600 may include container 602 and handle 606. Container 602 may also include port 604 which may be configured to receive one or more food ingredients and provide the one or more food ingredients to an internal volume of container 602 for food preparation.

In various embodiments, programmable food preparation device 600 may include one or more components configured to be operated manually, thus providing a semi-automatic food preparation process. For example, programmable food preparation device 600 may include mixing device 608 which may be configured to mix an internal volume of programmable food preparation device 600. In some embodiments, mixing device 608 may include a handle or knob which a user may use to move or rotate one or more components of mixing device 608, such as a mixing blade, within the internal volume of programmable food preparation device 600.

Moreover, programmable food preparation device 600 may further include crank 610 which may be coupled to a plunging device included within the internal volume of programmable food preparation device 600. Thus, crank 610 may be configured to move or adjust a position of the plunging device, which may be a plunger, in response to being rotated by the user. In some embodiments, as similarly discussed above, programmable food preparation device 600 may include a threaded central screw to which the plunging device and crank are coupled. In this way, the turning of crank 610 may modify the position of the plunging device, which may occur in response to the completion of the preparation of the food, and the contents of programmable food preparation device 600 may be evacuated.

Furthermore, according to some embodiments, programmable food preparation device 600 includes window 612 which is configured to enable visual observation of one or more internal components of programmable food preparation device 600. For example, an internal container of programmable food preparation device 600 may be made of a transparent material, such as PLEXIGLAS® ("Plexiglass" is a registered trademark of Arkema France Corp. of Colombes, France). In this example, window 612 may be configured to enable a user to see a location of internal components of programmable food preparation device 600, such as a mixing device and a plunging device.

Figure 6B:
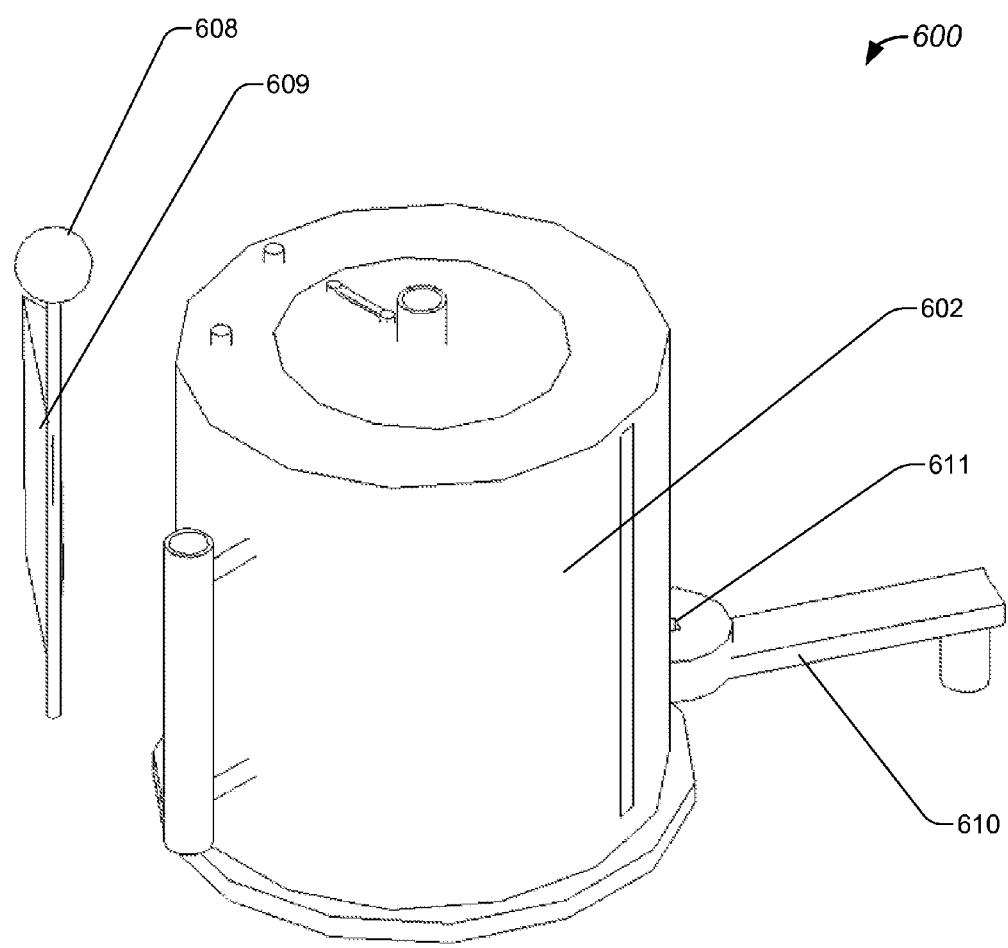
FIG. 6B illustrates an example of one or more components that may be included in a programmable food preparation device configured to prepare food, implemented in accordance with some embodiments.

FIG. 6B illustrates an example of one or more components that may be included in a programmable food preparation device configured to prepare food, implemented in accordance with some embodiments. As discussed above with reference to FIG. 6A, programmable food preparation device 600 may include one or more components configured to be operated manually, thus providing a semi-automatic food preparation process. Accordingly, FIG. 6B provides an additional view of programmable food preparation device 600 in which mixing device 608 and crank 610 have been decoupled and removed from container 602. As shown in FIG. 6B, mixing device 608 may include one or more components configured to mix an internal volume of programmable food preparation device 600, such as mixing blade 609. When included in container 602, mixing device 608 may be configured to receive a force at a knob or handle, and rotate mixing blade 609 within the internal volume of container 602 in response to receiving the force. Moreover, crank 610 may include socket 611 which may be configured to be removably coupled with a central screw of food preparation device 600. In this way, crank 610 may receive a rotational force from a user, and socket 611 may be configured to transfer the rotational force to the central screw and move a plunging device included within programmable food preparation device 600 to evacuate its contents.

Figure 7:
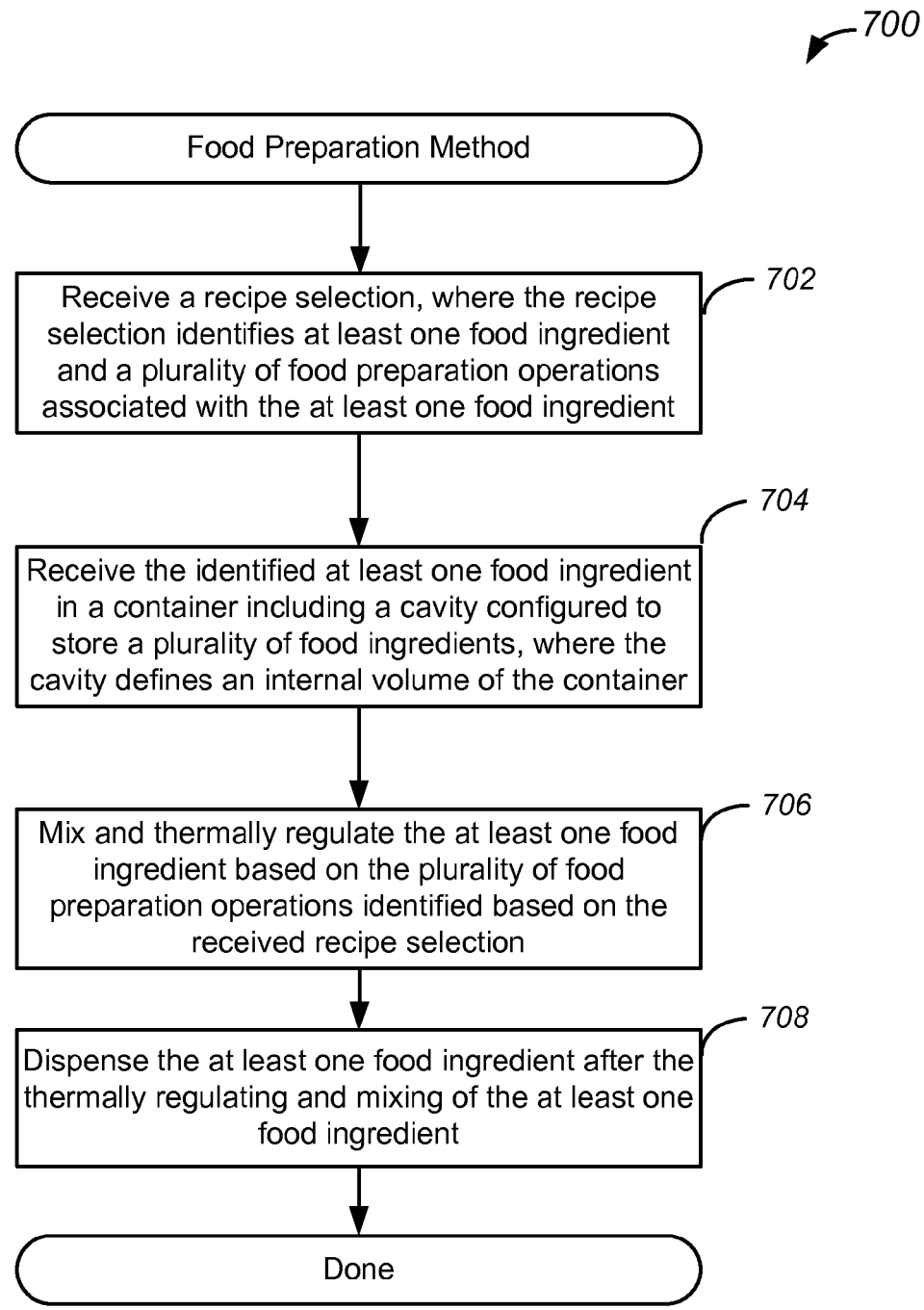
FIG. 7 illustrates a flow chart of a method for preparing food using a programmable food preparation device, implemented in accordance with some embodiments.

FIG. 7 illustrates a flow chart of a method for preparing food using a programmable food preparation device, implemented in accordance with some embodiments, such as device 100 (shown in FIG. 1), device 200 (shown in FIG. 2), device 400 (shown in FIG. 4), as well as device 500 and device 600 (shown in FIGS. 5A, 5B, 6A, and 6B). As previously discussed, a programmable food preparation device may receive a selection for an item of food or a foodstuff, and automatically prepare the food for consumption. In this way, a single food preparation device may obtain predetermined amounts of food ingredients, simultaneously mix and thermally regulate the food ingredients in a single container, and dispense the food ingredients for consumption. Moreover, the food preparation device may be integrated with aircraft or spacecraft to provide a programmable and substantially automated food preparation system for the flight crew. In some embodiments, a computer control program may aid the user in the process of preparing the food, either automatically, or semi-automatically. As discussed above with reference to FIG. 4, device 400 may facilitate substantial automation of a food preparation process, such as process 700, via the use of a display device and associated buttons and/or thumbwheels. In one example implemented on aircraft, various menu selections may be made from a first-class cabin touch screen device accessible by a traveler. The selection may be transmitted to a computer that controls the food preparation process. The display screen discussed above with reference to device 400 may provide alerts of progress, and requests for ingredients to be placed in containers/hoppers for delivery during the cooking process.

Accordingly, during operation 702, a recipe selection may be received. In some embodiments, the recipe selection may be made by a user as part of a request for food. For example, the user, who may be an astronaut, airplane flight attendant, or other flight staff member, may navigate a menu and select an item of food that he or she desires for a meal. In response to receiving the selection, a recipe that identifies ingredients and preparation operations may be retrieved from a memory device that may be included in a food preparation device or in an associated computer system.

During operation 704, at least one food ingredient may be identified and introduced into a container of the food preparation device. In some embodiments, prepackaged receptacles that include the food ingredients may already be coupled to the food preparation device as part of a food storage device or system. Accordingly, the food ingredients may be identified based on the selected recipe, and introduced into the food preparation device automatically and without user intervention. In some embodiments, if no food storage system is available, the user may manually introduce the food ingredients into the container. In some embodiments, one or more components of the programmable food preparation device may provide audible alerts, automated speech, or visual prompts on a display device to provide alerts and/or instructions to a user to instruct the user which ingredients to use, and when to add them.

During operation 706, the at least one food ingredient may be mixed and thermally regulated based on the plurality of food preparation operations identified by the received recipe selection. Thus, the food ingredients may be simultaneously mixed and thermal energy may be exchanged according to an automated series of food preparation operations. Once the food ingredients have been mixed and thermal energy has been exchanged in accordance with the selected recipe, during operation 708, the food ingredients may be dispensed for consumption by the user.

Figure 8:
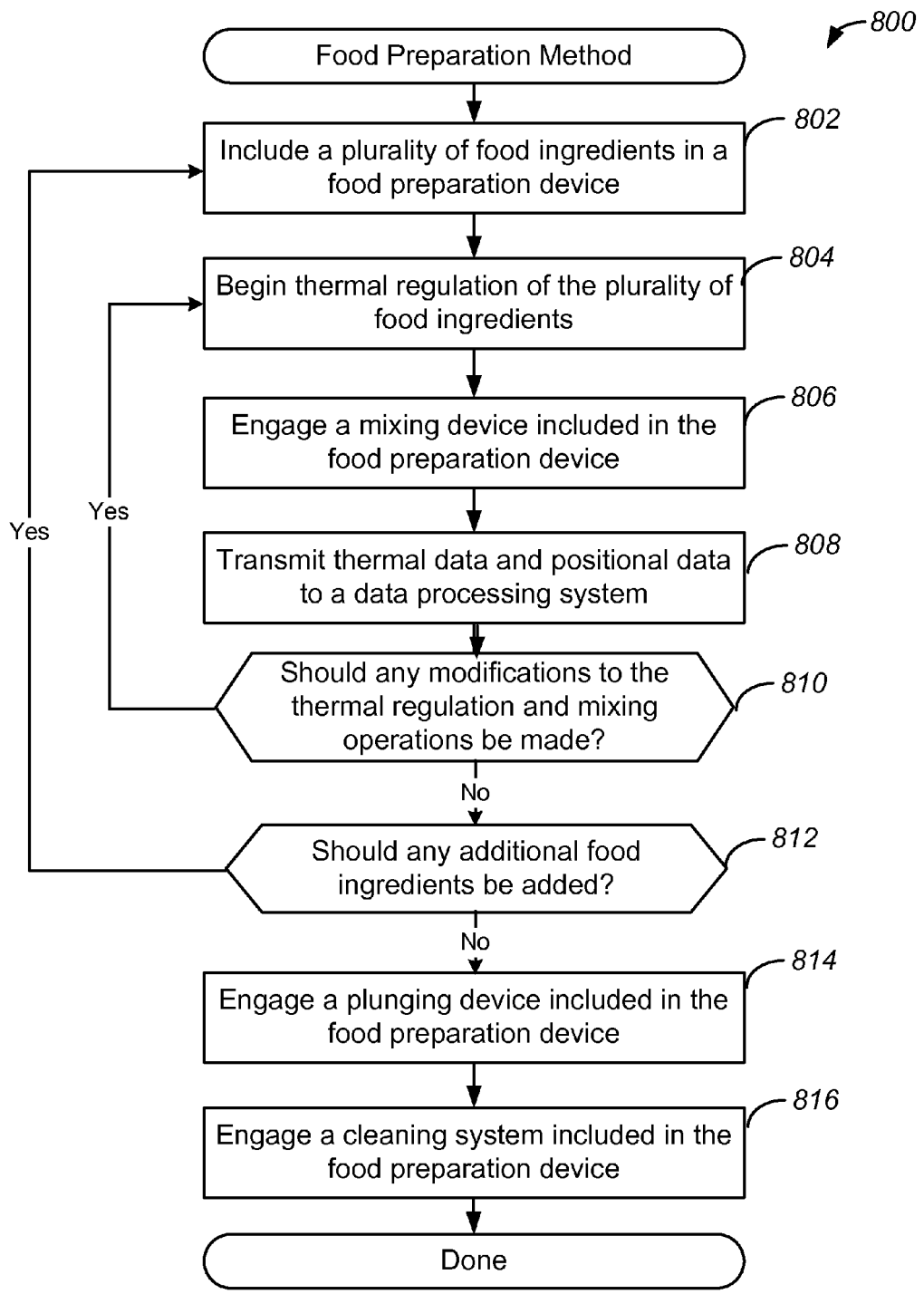
FIG. 8 illustrates a flow chart of another method for preparing food using a programmable food preparation device, implemented in accordance with some embodiments.

FIG. 8 illustrates a flow chart of another method for preparing food using a programmable food preparation device, implemented in accordance with some embodiments, such as device 100 (shown in FIG. 1), device 200 (shown in FIG. 2), device 400 (shown in FIG. 4), as well as device 500 and device 600 (shown in FIGS. 5A, 5B, 6A, and 6B). In various embodiments, method 800 illustrates additional features of thermal and mixing regulation that may be implemented with a method for preparing food, such as method 700 (shown in FIG. 7). As previously discussed, the programmable food preparation device may receive a selection for an item of food or a foodstuff, and automatically prepare the food for consumption. Accordingly, a single food preparation device may obtain predetermined amounts of food ingredients, simultaneously mix and thermally regulate the food ingredients in a single container, and dispense the food ingredients for consumption. Moreover, the food preparation device may be communicatively coupled with a computer system that may be configured to execute a computer control program that may automate substantially all of the food preparation operations. In this way, the preparation of the food may be preprogrammed and automatic, thus requiring minimal intervention from the user.

Accordingly, during operation 802, a plurality of ingredients may be included in a container of a food preparation device. As previously discussed, the ingredients may be identified based on a recipe selection made by a user, such as a crew member of an airplane, spacecraft, or space station. In some embodiments, the identity of each ingredient and a quantity of each ingredient may be identified based on a preprogrammed recipe that may be associated with a food item that has been selected, and may be stored within a data table of a memory device associated with a computer system. In some embodiments, the data table may include one or more data values identifying ingredients and preparation operations associated with each food item. For example, data stored for a particular recipe may identify instructions or commands for one or more components of the food preparation device, set point temperatures, time durations of operations, a list of errors, and a list of constraints for error or abort conditions. In this way, the data table may provide an organized representation of recipes in which an entire list of ingredients and associated operations may be identified and retrieved based on a received selection of a food item.

According to various embodiments, the ingredients may be included in the container automatically. As similarly discussed above, a food storage device or system may be coupled to the food preparation device. For example, the food storage system may include several containers or receptacles that each include individual food ingredients. One or more of the containers may be coupled to one or more holes of a plate of the container of the food preparation device. A computer control program associated with the selected recipe may have been previously programmed to identify specific ingredients that are included in the recipe, as well as a precise quantity of each ingredient included in the recipe. In some embodiments, each of the containers or receptacles coupled to the food preparation device may be coupled to an automatic food delivery device or system that may be included in or part of the food storage system, and may be configured to inject the contents of each receptacle into the container in response to receiving an input or command from the computer system. For example, the automatic food delivery system may include several syringes coupled to actuators. Thus, an amount of each ingredient identified by the computer control program may be automatically transferred from the receptacles into the container of the food preparation device.

In some embodiments, the ingredients may be included in the container manually. For example, in response to receiving a selection from the user and retrieving a recipe associated with the selection, a computer system may provide one or more instructions to be displayed on a display device of the food preparation device. For example, the display device may instruct the user to couple food containers including specific ingredients to particular holes of the plate of the food preparation device and may also instruct the user to insert a specific amount of each ingredient into the container of the food preparation device. In some embodiments, the user may provide an input to a button of the food preparation device, such as the buttons described above with reference to device 400 (shown in FIG. 4), once the instructions have been completed. The input may be a "READY" signal indicating that the user has completed including the ingredients in the container of the food preparation device.

During operation 804, the food preparation device may begin thermal regulation of the container. In various embodiments, thermal regulation of the container may be achieved by applying one or more currents to one or more heat transfer devices of the food preparation device. As previously discussed, the heat transfer devices may be thermoelectric devices that are capable of exchanging thermal energy with the container of the food preparation device based on a current that is passed through each thermoelectric device. In some embodiments, the application of the current is controlled by the computer control program executed by the computer system. The computer control program may control the operation of various components of food preparation device based on parameters identified by a recipe, which may include one or more data values such as a list of instructions, a list of set point temperatures, a list of time durations, a list of errors, and a list of constraints for error or abort conditions. Thus, the computer control program for a selected recipe may indicate that the food ingredients should be heated to a particular set point temperature, such as 150 degrees Fahrenheit. A current or voltage source may continue applying a voltage or current to the thermoelectric devices until the target set point temperature is reached. Moreover, the computer system and computer control program may be table driven or operate as a state machine, and step through various set point temperatures during the process of preparing the food. In this way, multiple heating and/or cooling operations may be performed automatically during the preparation of a single recipe.

It will be appreciated that while operation 804 may be performed after operation 802, in some embodiments, operation 804 may be performed during or prior to operation 802. For example, the container of the food preparation device may be heated during the introduction of the ingredients or prior to the introduction of the ingredients into the container.

During operation 806, the food preparation device may engage a mixing device within the container. As similarly discussed above, a mixing device may be included and positioned within the container of the food preparation device and may be controlled by the computer system and a computer control program associated with the computer system. For example, the computer system may provide one or more commands to the motor associated with the mixing device and a positioning actuator, if included. In this example, the motor may be engaged, and a threaded shaft included in the mixing device may thread and engage a mixing blade thus causing the mixing blade to be rotated to mix the contents of the container of the food preparation device. The speed of the rotation and mixing may be determined based on one or more parameters identified by the computer control program. The mixing blade may continue rotating and mixing until a target or set position is reached along the threaded shaft. For example, once the mixing blade approaches the end of the threaded shaft, as determined based on one or more telemetry devices, the rotation of the shaft and blade may be slowed, stopped, and reversed. The mixing may continue for a duration of time determined based on the computer control program. In this way, one or more mixing operations may be performed automatically during the preparation of the recipe.

During operation 808, thermal data and positional data may be transmitted to a computer system. As similarly discussed above, the food preparation device may include various sensors and telemetry devices configured to monitor and report data describing a temperature of the contents of the container and the position of one or more components included within the container. The data may be taken periodically or dynamically and in response to a request from the computer system. In this way, operation 808 may be performed numerous times during operation 804 and operation 806 to provide the computer system with feedback that enables the computer system to step through the execution of the computer control program.

During operation 810, it may be determined whether or not any modifications should be made to the thermal regulation and/or mixing of the food ingredients. For example, the temperature of the container may have deviated from a set point temperature by greater than a predetermined threshold, such as 3 degrees Fahrenheit. In this example, the contents of the container may have been heated to the target temperature, but may have cooled due to exposure of the food preparation device to the ambient environment. Thus, additional heating may be required to return the contents of the container to their target temperature. If it is determined that modifications should be made, food preparation method 800 may return to operation 804. If it is determined that modifications should not be made, food preparation method 800 may proceed to operation 812.

During operation 812, it may be determined whether or not any additional food ingredients should be added to the food preparation device. In some embodiments, a recipe may involve adding different ingredients at different times during the food preparation process. Thus, a first ingredient may be added initially, while a second ingredient may be added later. If it is determined that additional food ingredients should be added to the food preparation device, food preparation method 800 may return to operation 802. If it is determined that additional food ingredients should not be added to the food preparation device, food preparation method 800 may proceed to operation 814.

During operation 814, the food preparation device may engage a plunging device and empty the contents of the container. Thus, in some embodiments, the computer system may determine that the food is prepared and should be dispensed. One or more dispensing operations may be automatically executed in response to reaching the end of the computer control program for a particular recipe. For example, the computer system may be configured to provide one or more commands to the mixing device and the motor associated with the mixing device that cause the mixing device to park the mixing blade. In some embodiments, the temperature of the food may be automatically cooled to a preset serving temperature that may be user defined. Thus, astronauts serving on a space station may identify a specific temperature at which the food should be served. The food preparation device may be configured to automatically cool the food to the specified temperature prior to serving. Once the serving temperature has been reached, a plunger disc included in the mixing device may be moved to press and force the contents of the container into another container which may be an external vessel.

During operation 816, the food preparation device may engage a cleaning system to clean an interior of the container. The cleaning system may inject soap and water into the container of the food preparation device. The mixing blade and plunger disc of the mixing device may be moved back and forth to ensure that all interior surfaces are cleaned by the soap and water. Upon termination of a cleaning sequence, the soap and water may be evacuated from the container via an exhaust hose or valve.

FIG. 9 illustrates a data processing system configured in accordance with some embodiments, such as device 100 (shown in FIG. 1), device 200 (shown in FIG. 2), device 400 (shown in FIG. 4), as well as device 500 and device 600 (shown in FIGS. 5A, 5B, 6A, and 6B). Thus, according to some embodiments, a system for preparing food is disclosed herein that may include one or more components of a device, such as device 100 (shown in FIG. 1), device 200 (shown in FIG. 2), device 400 (shown in FIG. 4), as well as device 500 and device 600 (shown in FIGS. 5A, 5B, 6A, and 6B), and one or more components of a data processing system, such as system 900 discussed in greater detail below.

In some embodiments, one or more components of system 900 may be implemented as on board components of the food preparation device, and/or implemented within a laptop, an external hand held device, or built into a keypad/touchscreen display on the food preparation device. For example, time and safety critical control operations and monitoring may be embedded within one or more components of the food preparation device. For example, discrete electronic control logic may be implemented to regulate the thermoelectric devices included within the food preparation device. In some embodiments, the control logic may include a microprocessor or other logic circuits. According to various embodiments, the distribution of the computing functions and/or hardware may be determined based on one or more requirements of space flight, commercial flight, or commercial product certification. Moreover, according to some embodiments, one or more components of system 900 may be implemented external to the food preparation device. For example, data may be collected by on board sensors and provided to an external control computer system for analysis.

In various embodiments, data processing system 900, also referred to herein as a computer system, may be used to implement one or more computers used in a controller or other components of systems described above. In some embodiments, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation. For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 may be a network interface card, universal serial bus (USB) interface, or other suitable communications device/interface.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code 918.

Figure 10:
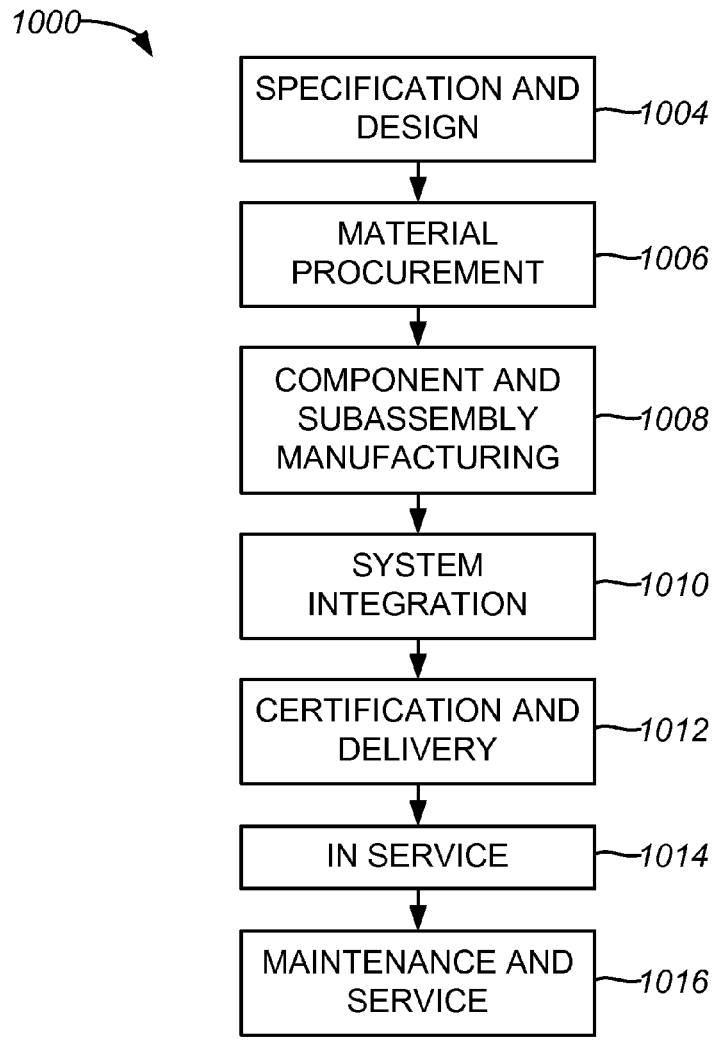
FIG. 10 illustrates a flow chart of an example of an aircraft production and service methodology, implemented in accordance with some embodiments.
Figure 11:
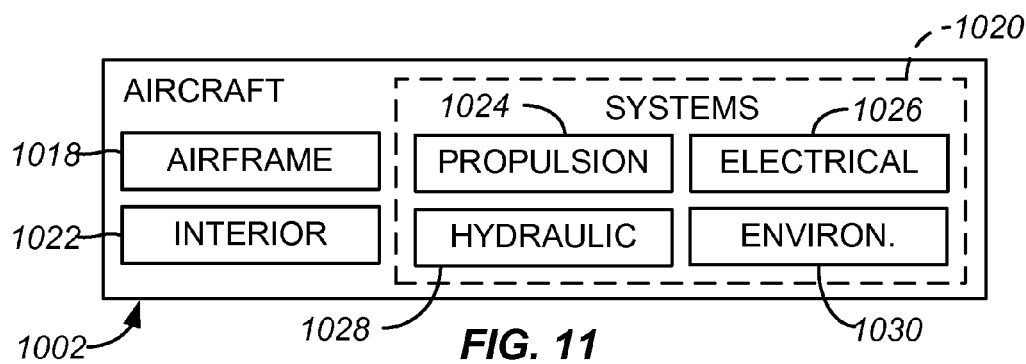
FIG. 11 illustrates a block diagram of an example of an aircraft, implemented in accordance with some embodiments.

As discussed above, various embodiments of food preparation devices disclosed herein, such as device 100 (shown in FIG. 1), device 200 (shown in FIG. 2), device 400 (shown in FIG. 4), as well as device 500 and device 600 (shown in FIGS. 5A, 5B, 6A, and 6B), may be integrated with aircraft and spacecraft. Accordingly, the manufacture of such devices may be described in the context of an aircraft manufacturing and service method 1000 as shown in FIG. 10 and an aircraft 1002 as shown in FIG. 11. During pre-production, illustrative method 1000 may include specification and design 1004 of the aircraft 1002 and material procurement 1006. During production, component and sub-assembly manufacturing stages 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016 (which may also include modification, reconfiguration, refurbishment, and so on).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 1002 produced by illustrative method 1000 may include an airframe 1018 with a plurality of systems 1020 and an interior 1022. Examples of high-level systems 1020 include one or more of a propulsion system 1024, an electrical system 1026, a hydraulic system 1028, and an environmental system 1030. Any number of other systems may be included. In various embodiments, food preparation devices, such as device 100 (shown in FIG. 1), device 200 (shown in FIG. 2), device 400 (shown in FIG. 4), as well as device 500 and device 600 (shown in FIGS. 5A, 5B, 6A, and 6B), may be implemented with systems included in systems 1020 or components implemented in interior 1022. Although an aerospace example is shown, the principles of the embodiments described herein may be applied to other industries, such as the automotive industry.

Devices and methods embodied herein may be employed during any one or more of the stages of the production and service method 1000. For example, components or subassemblies corresponding to production stages 1008 and 1010 may be fabricated or manufactured in a manner similar to components or subassemblies produced while the aircraft 1002 is in service. Also, one or more device embodiments, method embodiments, or a combination thereof may be utilized during the production stages 1008 and 1010, for example, by substantially expediting assembly of or reducing the cost of an aircraft 1002. Similarly, one or more of device embodiments, method embodiments, or a combination thereof may be utilized while the aircraft 1002 is in service, for example and without limitation, to maintenance and service 1016.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A device for preparing food, the device comprising:
a container including a cavity configured to store at least one food ingredient, wherein the cavity defines an internal volume of the container, the container being a cylindrical container;
a first plate coupled to a first end of the container, wherein the first plate includes at least one hole configured to receive the at least one food ingredient;
a second plate coupled to a second end of the container;
a mixing device coupled to the first plate, wherein the mixing device is configured to mix the at least one food ingredient in the internal volume of the container, the mixing device comprising a mixing blade configured to move between the first plate and the second plate, and along a length of the container while mixing the at least one food ingredient;
a heat transfer device coupled to a side of the container, wherein the heat transfer device is configured to exchange thermal energy with the internal volume of the container via the side of the container, and wherein the heat transfer device comprises a plurality of Peltier devices having a first side coupled to an external surface of the side of the container; and
a support member coupled to each of the plurality of Peltier devices, the support member comprising tubing through each of a plurality of heat sinks coupled to a second side of the plurality of Peltier devices, the tubing being configured to route a liquid by the second side of the plurality of Peltier devices.

2. The device of claim 1, wherein the second side comprises a cooling side of the plurality of Peltier devices.

3. The device of claim 1, wherein the mixing device comprises:
a threaded shaft positioned in the cavity of the container; and
a plunger disc operable to be coupled to the threaded shaft,
wherein the mixing blade is operable to be coupled to the threaded shaft.

4. The device of claim 3 further comprising a positioning actuator configured to couple and decouple each of the mixing blade and the plunger disc with the threaded shaft.

5. The device of claim 1 further comprising a food storage device including a plurality of food containers, wherein at least one of the plurality of food containers is configured to be coupled with the at least one hole of the first plate.

6. The device of claim 1 further comprising a communications interface configured to be communicatively coupled with a data processing system, the data processing system configured to control one or more food preparation operations associated with the at least one food ingredient.

7. The device of claim 1 further comprising:
a display device configured to display information describing one or more food preparation operations associated with the at least one food ingredient; and
a keypad configured to receive at least one input from a user.

8. The device of claim 1 further comprising:
a telemetry device configured to identify and transmit positional data associated with one or more components of the mixing device; and
a plurality of temperature sensors configured to identify and transmit thermal data associated with the heat transfer device and the internal volume of the container.

9. The device of claim 8, wherein at least one magnet is included in the mixing blade of the mixing device, and wherein the telemetry device includes a plurality of coils of wire, wherein each coil of wire of the plurality of coils of wire is configured to transmit a signal in response to detecting a magnetic field generated by the at least one magnet.

10. The device of claim 1 farther comprising a cleaning device configured to clean the internal volume of the container, wherein the cleaning device comprises:
a plurality of containers configured to inject soap and water into the internal volume of the container; and
an evacuation device configured to empty the internal volume of the container.

11. The device of claim 10, wherein the evacuation device comprises a vacuum pump.

12. The device of claim 1, wherein the container, the first plate, the second plate, the mixing device, and the heat transfer device are included in an external container, wherein the external container is configured to be portable and hand-held.

13. A method for preparing food, the method comprising:
receiving a recipe selection, wherein the recipe selection identifies at least one food ingredient and a plurality of food preparation operations associated with the at least one food ingredient;
receiving the identified at least one food ingredient in a container including a cavity configured to store a plurality of food ingredients, wherein the cavity defines an internal volume of the container, wherein the container is a cylindrical container having a first end coupled to a first plate, and a second end coupled to a second plate, and wherein the at least one food ingredient is received via at least one hole in the first plate;
thermally regulating, using a plurality of Peltier devices having a first side coupled to a side of the container, and a support member comprising tubing through each of a plurality of heat sinks coupled to a second side of the plurality of Peltier devices, the tubing routing a liquid by the second side of the plurality of Peltier devices, the at least one food ingredient based on the plurality of food preparation operations identified based on the received recipe selection, the thermally regulating comprising exchanging thermal energy with the internal volume of the container; and
mixing, using a mixing device comprising a mixing blade, the at least one food ingredient based on the plurality of food preparation operations identified based on the received recipe selection, the mixing comprising moving the mixing device between the first plate and the second plate, and along a length of the container.

14. The method of claim 13, wherein the thermally regulating comprises automatically controlling a temperature of the internal volume of the container via the plurality of Peltier devices.

15. The method of claim 13, wherein the mixing comprises:
automatically engaging a mixing blade positioned within the internal volume of the container; and
automatically rotating the mixing blade to mix the at least one food ingredient included in the internal volume of the container.

16. The method of claim 13 further comprising:
injecting soap into the internal volume of the container;
injecting water into the internal volume of the container; and
evacuating the internal volume of the container.

17. A system for preparing food, the system comprising:
a container including a cavity configured to store at least one food ingredient, wherein the cavity defines an internal volume of the container, the container being a cylindrical container;
a first plate coupled to a first end of the container, wherein the first plate includes at least one hole configured to receive the at least one food ingredient;
a second plate coupled to a second end of the container;
a mixing device coupled to the first plate, wherein the mixing device is configured to mix at least a portion of the internal volume of the container;
a heat transfer device coupled to a side of the container, wherein the heat transfer device is configured to exchange thermal energy with the internal volume of the container via the side of the container, and wherein the heat transfer device comprises a plurality of Peltier devices having a first side coupled to an external surface of the side of the container;

a support member coupled to each of the plurality of Peltier devices, the support member comprising tubing through each of a plurality of heat sinks coupled to a second side of the plurality of Peltier devices, the tubing being configured to route a liquid by the second side of the plurality of Peltier devices; and a data processing system configured to control the mixing device and the heat transfer device based on one or more food preparation operations included in a computer control program associated with the at least one food ingredient.

18. The system of claim 17 further comprising:

a telemetry device configured to identify and transmit positional data associated with one or more components of the mixing device; and a plurality of temperature sensors configured to identify and transmit thermal data associated with the heat transfer device and the internal volume of the container.

19. The system of claim 18, wherein the data processing system is configured to receive the positional data and thermal data, and is further configured to provide one or more instructions to the mixing device and the heat transfer device based on the received positional data and thermal data.

* * * * *